(12) United States Patent
Fleischer et al.

(10) Patent No.: US 11,727,294 B2
(45) Date of Patent: Aug. 15, 2023

(54) METHOD AND SYSTEM FOR QUANTUM INFORMATION PROCESSING AND COMPUTATION

(71) Applicant: Trustees of Princeton University, Princeton, NJ (US)

(72) Inventors: Jason W. Fleischer, Princeton, NJ (US); Chien-Hung Lu, Newark, CA (US); Xiaohang Sun, Princeton, NJ (US); Matthew Reichert, Kendall Park, NJ (US); Hugo Defienne, Étang Salé (FR)

(73) Assignee: Trustees of Princeton University, Princeton, NJ (US)

( * ) Notice: Subject to any disclaimer, the term of this patent is extended or adjusted under 35 U.S.C. 154(b) by 1576 days.

(21) Appl. No.: 15/663,535

(22) Filed: Jul. 28, 2017

(65) Prior Publication Data
US 2018/0032896 A1 Feb. 1, 2018

Related U.S. Application Data

(60) Provisional application No. 62/368,852, filed on Jul. 29, 2016, provisional application No. 62/368,834, filed on Jul. 29, 2016.

(51) Int. Cl.
*H01L 27/00* (2006.01)
*G06N 10/00* (2022.01)
(Continued)

(52) U.S. Cl.
CPC ............... *G06N 10/00* (2019.01); *G06E 1/04* (2013.01); *G06E 3/005* (2013.01); *G06F 17/14* (2013.01);
(Continued)

(58) Field of Classification Search
CPC .......... G06N 10/00; G06E 1/04; G06E 3/005; G06F 17/14; G06F 17/17; G06F 17/18; G02F 2203/12; G06T 5/10
See application file for complete search history.

(56) References Cited

U.S. PATENT DOCUMENTS 5,164,913 A * 11/1992 Guilfoyle .................. G06E 1/02
708/191
5,333,117 A * 7/1994 Ha ............................ G06E 1/04
708/493

(Continued)

OTHER PUBLICATIONS

A. Just, A. Cavanna, M.V. Chekhova, G. Leuchs, "Tranverse entanglement of biphotons," New Journal of Physics, 15 (2013) 083015.

(Continued)

*Primary Examiner* — Philip P. Dang
(74) *Attorney, Agent, or Firm* — FisherBroyles, LLP

(57) ABSTRACT

A quantum information processing system comprises a light source, a detector, at least one spatial light modulator and at least one optical lens. The light source is configured to provide a beam of entangled photons. The at least one optical lens is configured to project the resultant beam onto the spatial light modulator, either by direct imaging or by performing a full or partial optical Fourier transform. Said spatial light modulator includes a plurality of discrete pixels and is configured to select one or more of the plurality of discrete pixels to generate a resultant beam from said beam of entangled photons. The resultant beam from said spatial light modulator is projected onto the detector. For optical computation, such as search algorithms, the configuration and projections are repeated to find the optimal solution.

31 Claims, 15 Drawing Sheets

(51) Int. Cl.
*G06E 1/04* (2006.01)
*G06F 17/18* (2006.01)
*G06F 17/17* (2006.01)
*G06F 17/14* (2006.01)
*G06E 3/00* (2006.01)
*G06T 5/10* (2006.01)

(52) U.S. Cl.
CPC .............. *G06F 17/17* (2013.01); *G06F 17/18* (2013.01); *G02F 2203/12* (2013.01); *G06T 5/10* (2013.01)

(56) References Cited

U.S. PATENT DOCUMENTS

| | | | | |
|---|---|---|---|---|
| 5,432,722 | A * | 7/1995 | Guilfoyle | G06E 1/04 359/107 |
| 6,078,963 | A * | 6/2000 | Civanlar | H04L 45/586 709/238 |
| 6,218,832 | B1 * | 4/2001 | Chuang | G06N 10/00 324/307 |
| 7,028,275 | B1 * | 4/2006 | Chen | G06N 10/00 703/2 |
| 7,039,252 | B2 * | 5/2006 | Ludwig | G06T 5/10 382/280 |
| 7,054,504 | B2 * | 5/2006 | Ludwig | G02B 27/46 382/280 |
| 7,529,717 | B2 * | 5/2009 | Vala | B82Y 10/00 706/14 |
| 7,567,596 | B2 * | 7/2009 | Dantus | G01B 9/02091 372/27 |
| 7,609,731 | B2 * | 10/2009 | Dantus | G01N 21/4795 372/9 |
| 7,738,945 | B2 * | 6/2010 | Fauver | G01N 21/05 382/133 |
| 7,973,936 | B2 * | 7/2011 | Dantus | G01J 11/00 356/451 |
| 8,174,932 | B2 * | 5/2012 | Lee | G01S 5/28 367/118 |
| 8,242,428 | B2 * | 8/2012 | Meyers | G01S 17/003 250/203.6 |
| 8,300,669 | B2 * | 10/2012 | Dantus | G01B 9/02014 359/239 |
| 8,675,699 | B2 * | 3/2014 | Dantus | G01J 11/00 372/25 |
| 8,760,661 | B2 * | 6/2014 | Cui | H01S 3/0057 356/450 |
| 8,811,763 | B2 * | 8/2014 | Meyers | G01B 11/24 348/E5.029 |
| 8,849,667 | B2 * | 9/2014 | Ben-Ezra | G10L 15/142 704/254 |
| 9,189,744 | B2 * | 11/2015 | Levin | G06N 20/00 |
| 9,200,887 | B2 * | 12/2015 | Potsaid | G01B 9/02091 |
| 9,335,605 | B2 * | 5/2016 | Wang | G03H 1/04 |
| 9,545,223 | B2 * | 1/2017 | MacFarlane | A61B 5/0042 |
| 9,846,313 | B2 * | 12/2017 | Nikolenko | G02B 27/46 |
| 10,061,111 | B2 * | 8/2018 | Hillman | G02B 21/0052 |
| 10,151,634 | B2 * | 12/2018 | Abdulhalim | G01J 4/00 |
| 10,356,392 | B2 * | 7/2019 | Riza | H04N 13/211 |
| 11,156,835 | B2 * | 10/2021 | Samec | A61B 5/398 |
| 2004/0233944 | A1 * | 11/2004 | Dantus | G01B 9/02014 372/25 |
| 2006/0187974 | A1 * | 8/2006 | Dantus | H01J 49/164 372/9 |
| 2014/0365221 | A1 * | 12/2014 | Ben-Ezra | G10L 15/25 704/256.1 |
| 2015/0323787 | A1 * | 11/2015 | Yuste | G06V 20/693 348/79 |
| 2016/0270656 | A1 * | 9/2016 | Samec | A61B 5/361 |
| 2016/0306258 | A1 * | 10/2016 | Mazur | G02F 1/3544 |
| 2018/0143373 | A1 * | 5/2018 | Cizmár | G06F 17/18 |

OTHER PUBLICATIONS

A. Lamas-Linares, J.C. Howell, D. Bouwmeester, "Stimulated emission of polarization-entangled photons," Nature, 412 (2001) 887-890.
C.-H. Lu, X. Sun, M. Reichert, J.W. Fleischer, "Quantum phase imaging via spatially entanglement," arxiv:1507.01227, (2015).
J.-T. Lu, A.S. Goy, J.W. Fleischer, "Nonlinear digital imaging," arxiv:1507.08601, (2015).
K.W. Chan, J.P. Torres, J.H. Eberly, "Transverse entanglement migration in Hilbert space," Physical Review A, 75 (2007) 050101.
S.P. Walborn, C.H. Monken, S. Pádua, P.H. Souto Ribeiro, "Spatial correlations in parametric down-conversion," Physics Reports, 495 (2010) 87-139.
X.Y. Zou, L.J. Wang, L. Mandel, "Induced Coherence and Indistinguishability in Optical Interference," Physical Review Letters, 67 (1991) 318-321.

* cited by examiner

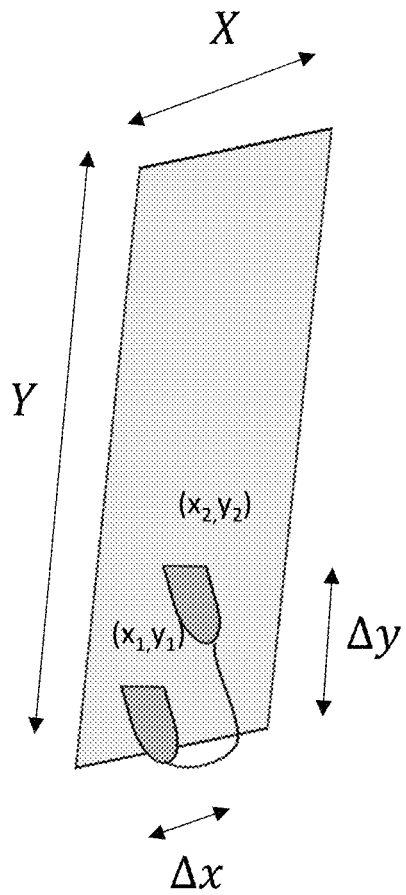
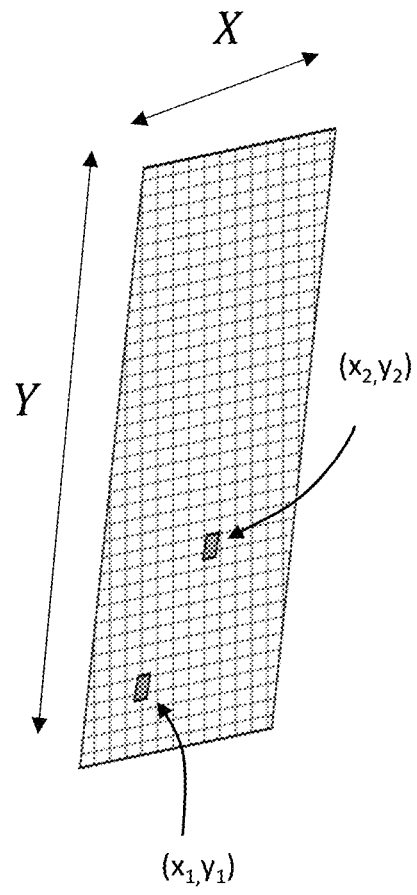
Figure 1a
(prior art)
Figure 1b
(prior art)

a.

b.

a. Conditional probability b. Unidimentional coincidence probability
(Column 45 vs Column 33)

METHOD AND SYSTEM FOR QUANTUM INFORMATION PROCESSING AND COMPUTATION

CROSS-REFERENCE TO RELATED APPLICATIONS

This application claims the benefit of priority under 35 U.S.C. § 119(e) to U.S. Provisional Patent Application No. 62/368,852 filed on Jul. 29, 2016, and U.S. Provisional Patent Application 62/368,834 filed on Jul. 29, 2016, the entire disclosure of each of which is hereby incorporated herein by reference.

STATEMENT REGARDING GOVERNMENT SUPPORT

This invention was made with government support under Grants No. FA9550-12-1-0054 and No. FA9550-14-1-0177 awarded by the Air Force Office of Scientific Research. The government has certain rights in the invention.

FIELD OF INVENTION

The present invention relates generally to detection and measurement in quantum optics, and more specifically, to a quantum information processing system configured for the detection and measurement of entangled photon pairs.

BACKGROUND

Quantum optical computation and quantum information processing ("QIP") is a paradigm of universal quantum computation in which photons are utilized as information carriers. Elements such as beam splitters, phase shifters, and mirrors are arranged in a desired fashion to process quantum information, and photon detectors and quantum memories are employed to detect and store quantum information.

Conventional prior art approaches for QIP can use polarization-entanglement. An exemplary arrangement comprises waveplates to control and measure the degree of polarization, and synchronized point detectors for coincidence detection. In traditional photonic systems, bits are encoded in polarization states and are detected with point detectors. Half-wave plates ("HWP") and polarizing beam splitters ("PBS") may be arranged to perform a desired quantum computation.

Conventional approaches are quite complex, with a need for an increased number of optical elements and point detectors that does not scale well with increasing numbers of entangled photons (quantum bits).

In current implementations, correlations between different points have traditionally been measured using sets of point detectors. However, scanning these detectors with respect to each other becomes increasingly tedious and inefficient as the number of target points increases. This is important not only for quantum optics but for statistical physics in general.

Thus, there is a need for scalable systems for performing quantum optical computation. Relatedly, a need exists for a method and system for determining correlations for an arbitrarily large number of points.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An exemplary quantum information processing system comprises a light source, a detector, at least one spatial light modulator, and at least one optical lens. The light source is configured to provide a beam of two or more entangled photons. The spatial light modulator includes a plurality of discrete pixels and is configured to select one or more of the plurality of discrete pixels to generate a resultant beam from said beam of entangled photons. The at least one optical lens is configured to project the resultant beam onto the detector, either by direct imaging or by performing a full or partial optical Fourier transform.

BRIEF DESCRIPTION OF DRAWINGS

An understanding of the following description will be facilitated by reference to the attached drawings, in which:

FIG. 1a is a block diagram illustrating a prior art system of point detectors, each of which must be scanned to obtain a complete joint probability distribution;

FIG. 1b is a block diagram illustrating a prior art pixel array, such as that found in a CCD camera, that can be used to correlate a number of pixels at once;

DETAILED DESCRIPTION

Entanglement is an intriguing feature of quantum theory and is at the heart of quantum information processing. There has been increasing interest in the development of photonic sources generating entangled states of light with high dimensions. High-dimensional entanglement has been used to exploit different types of degrees of freedom of light, such as orbital angular momentum or frequency modes. Further, spatially entangled photon-pairs, such as those generated by Spontaneous Parametric Down Conversion (SPDC), exhibit correlations between many spatial modes. This large amount of entanglement offers new perspectives for applications in quantum information processing, quantum cryptography, and/or quantum imaging.

FIG. 1a illustrates a typical prior art configuration for measuring the joint probability distribution of at least one entangled photon pair. At least two single-point photodetectors are used to detect coincidence at points $(x_1, y_1)$ and $(x_2, y_2)$ in a two-dimensional plane. These are then scanned for all points (x,y) and all separation distances to measure a complete joint probability distribution. This scanning is inefficient, time-consuming, and does not scale well to higher numbers of entangled photons and higher degrees/dimensions of entanglement.

Figure 2:
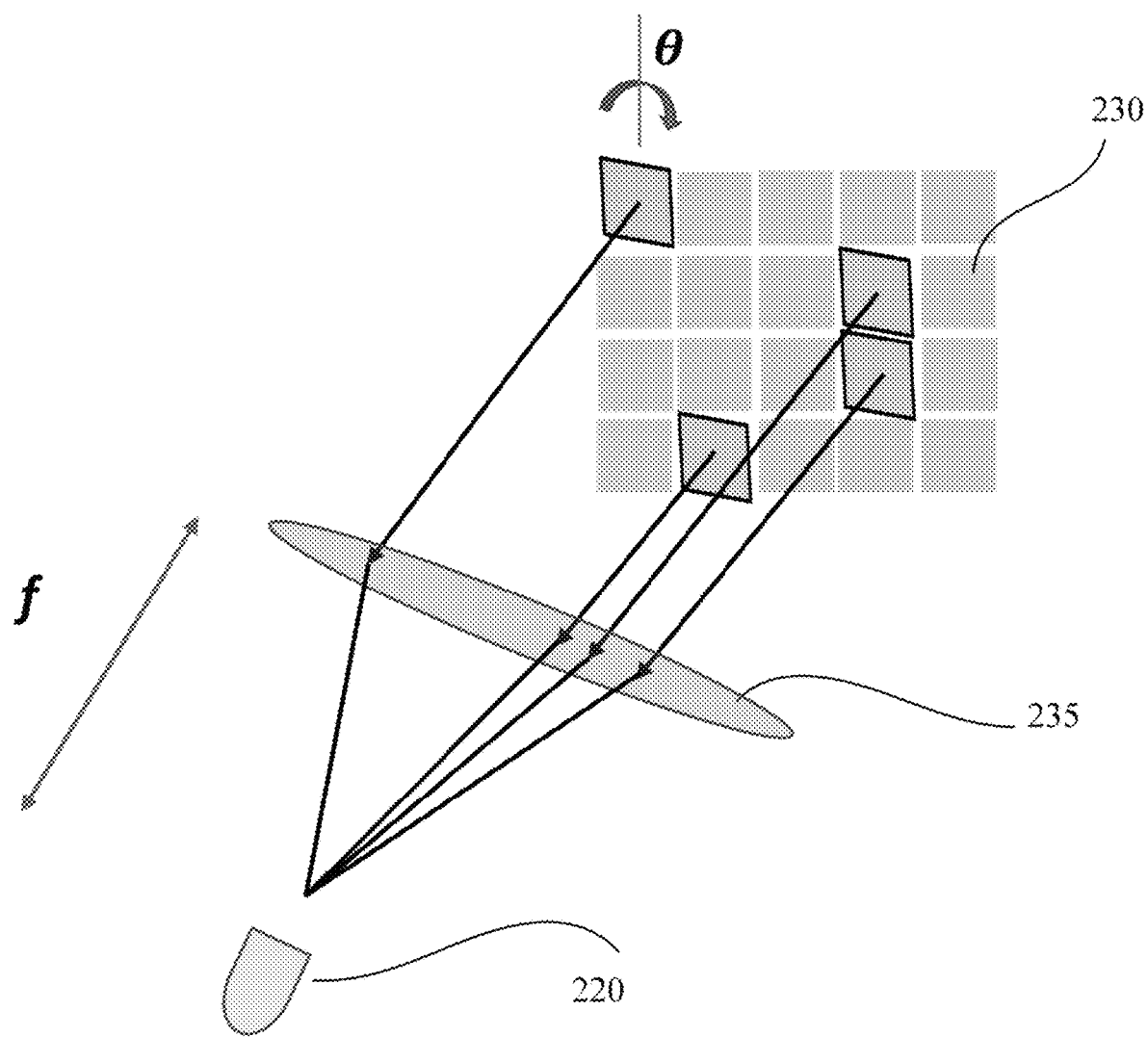
FIG. 2 is a block diagram depicting schematically a quantum information processing system in accordance with one or more embodiments of the present invention.

FIG. 2 illustrates an embodiment of a system 200 for quantum information processing. As illustrated, the system 200 includes a light source, a detector 220, a spatial light modulator (SLM) 230, and an optical lens 235. In one embodiment, certain pixels on said SLM 230 deflect the incoming light at a given angle; the deflected rays are then mapped to a single point using said lens 235. Photons arriving at said focal point are then detected by said detector 220.

In various embodiments, the system 200 may include more than one SLM and/or more than one optical lens. In various embodiments, the SLM 230 includes a plurality of discrete pixels and is configured to select one or more of the plurality of discrete pixels to generate a resultant beam of entangled photons. Further, the optical lens 235 may be configured to project the resultant beam generated by the SLM 230 onto the detector 220 using an optical Fourier transform.

In another embodiment, photons generated by the light source are incident on a pixel array. In some embodiments, an optical lens 235 is used to image photons onto the detector 220. In some embodiments, an optical lens 235 is configured to perform a full or partial optical Fourier transform on the detector 220. FIG. 1b is a block diagram illustrating a prior art pixel array, such as that found in a CCD camera, that can be used to correlate a number of pixels at once.

The detector 220 of FIG. 2 may in some embodiments be a point detector for mapping all pairs to a single point of detection. However, detector 220 could also be a camera, to allow for the sampling to be spread out.

If a single point detector (e.g., photodetector) is replaced by a multi-point detector (such as a CCD camera), then multiple points on the modulator 230 can be mapped to multiple points on the detector 220. For example, in the case of two point detectors or camera pixels, one or more pixels on the modulator may be mapped to a first point-detector, while one or more pixels may be mapped to a second point-detector. Additionally, at least one of interference and quantum-beating information between different points can be obtained. In some embodiments, higher-order correlations can be obtained. These measurements can be used to retrieve phase and higher-order degrees of correlation and entanglement.

According to one embodiment, the SLM 230 and an imaging system (detector 220) is utilized to correlate an arbitrary number of points. In one embodiment, the object is imaged onto a micromirror array, whose pixels can tilt in a given direction when activated. For example, the SLM 230 may select one or more pixel based on selection information. In various embodiments, instead of mechanically scanning different separation distances $\Delta x_{i,j}$ for every pair $(x_i, x_j)$ in the set $\{x\}$, as done conventionally, the SLM 230 enables extremely fast correlation of an arbitrary number of points. For example, the SLM 230 enables up to about 20 MHz correlation up to the number of pixels in the SLM 230.

In one embodiment, the SLM 230 includes a fast array of tilt mirrors configured to relay points of a scene to a single pixel photodetector (detector 220). In such embodiments, any number of points, up to the pixel count of the SLM, can be correlated using such a method.

In one embodiment, the lens 240 is configured to project the tilted pixels onto the detector 220 using an optical Fourier transform.

In one embodiment, the SLM 230 is configured to make at least one aperture that selects a small portion of said beam and said optical lens performs an optical Fourier transform on the resultant beam. This creates a local, or windowed, Fourier transform on said beam. To measure the full light field of said beam, the configuration on said SLM is changed so as to scan said aperture across the transverse waveform of said beam.

In one embodiment, said aperture configuration on the SLM 230 is spatially coded. In one embodiment, this coding allows reconstruction of phase or correlations along the optical axis.

In one or more embodiments, the detector 220 includes a photo-sensitive screen that transforms photons into photo-electrons with a quantum efficiency n (physical process) and by an amplifier that transforms the photo-electron signal into a measurable voltage signal (electronical process). This electronical process is fully described by the conditional probability function P(g|k), which corresponds to the probability of returning an output value g given a number of k photo-electrons generated at a given pixel of the screen. The detection device also sets the exposure time window $\tau$.

In one embodiment, the photo-sensitive screen is not sensitive to the polarization and the coherence time of a pair is much shorter than the minimum exposure time of the camera. These properties allow the consideration of the spatial dependence of the two-photon wavefunction. For example, in the case of photon-pairs generated by type-I SPDC with a continuous pump laser and filtered at the output by a 3 nm bandwidth filter, the temporal width of one pair is about 2 ps, which is much shorter than the minimum exposure time of a camera of 1 µs.

Figure 5:
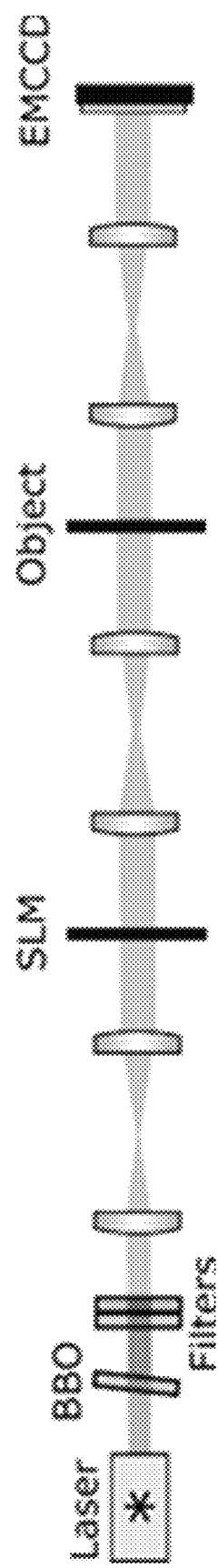
FIG. 5 is a block diagram of an alternative quantum information processing systems in accordance with one or more embodiments of the present invention.

FIG. 5 is a schematic depicting operation of a detection system's quantum enlarger according to one or more embodiments of the present invention. As shown in FIG. 5, the spatial scale of correlations/entanglement can be changed using simple imaging by magnifying or de-magnifying the beam. By enlarging the beam to spread correlations out over an entire slm or detector sample, the wavefront can be better sampled.

In one embodiment, a detection system may include a quantum enlarger configured to detect sub-wavelength modulations. For quantum illumination, sub-wavelength information can be encoded in the correlations, embedded on the base wavelength spatial scale as a type of (phase) modulation. As such, this correlation length scales linearly with magnification in an optical system and can be brought to scales larger than a wavelength, improving detection of the embedded information. FIG. 5 shows a schematic of magnification within an optical system.

It is important to note that this process can be repeated sequentially to reveal information at finer and finer scales of resolution. For example, magnification by a factor of 2 in a conventional diffraction-limited system will allow features of λ/4 to be imaged while features of λ/8 and smaller will decay evanescently. Magnification by a factor of 4 will reveal the next-order features while filtering out those smaller, etc. Successive subtraction then allows easy distinction of multiphoton processing.

In one embodiment, the detection system is further configured to convert the coherence encoding to an intensity variation that the camera can measure. Such a conversion uses the magnified image as a seed wave for further parametric down conversion, creating an induced beam that is first-order (vs. second-order) coherent with the first. Simple interference then reveals a spatially encoded intensity pattern in the camera. In another embodiment, the image can be defocused, so that phase variations in the wavefront are converted to intensity variations on the detector. The original wavefront pattern can then be reconstructed numerically.

Figure 4A:
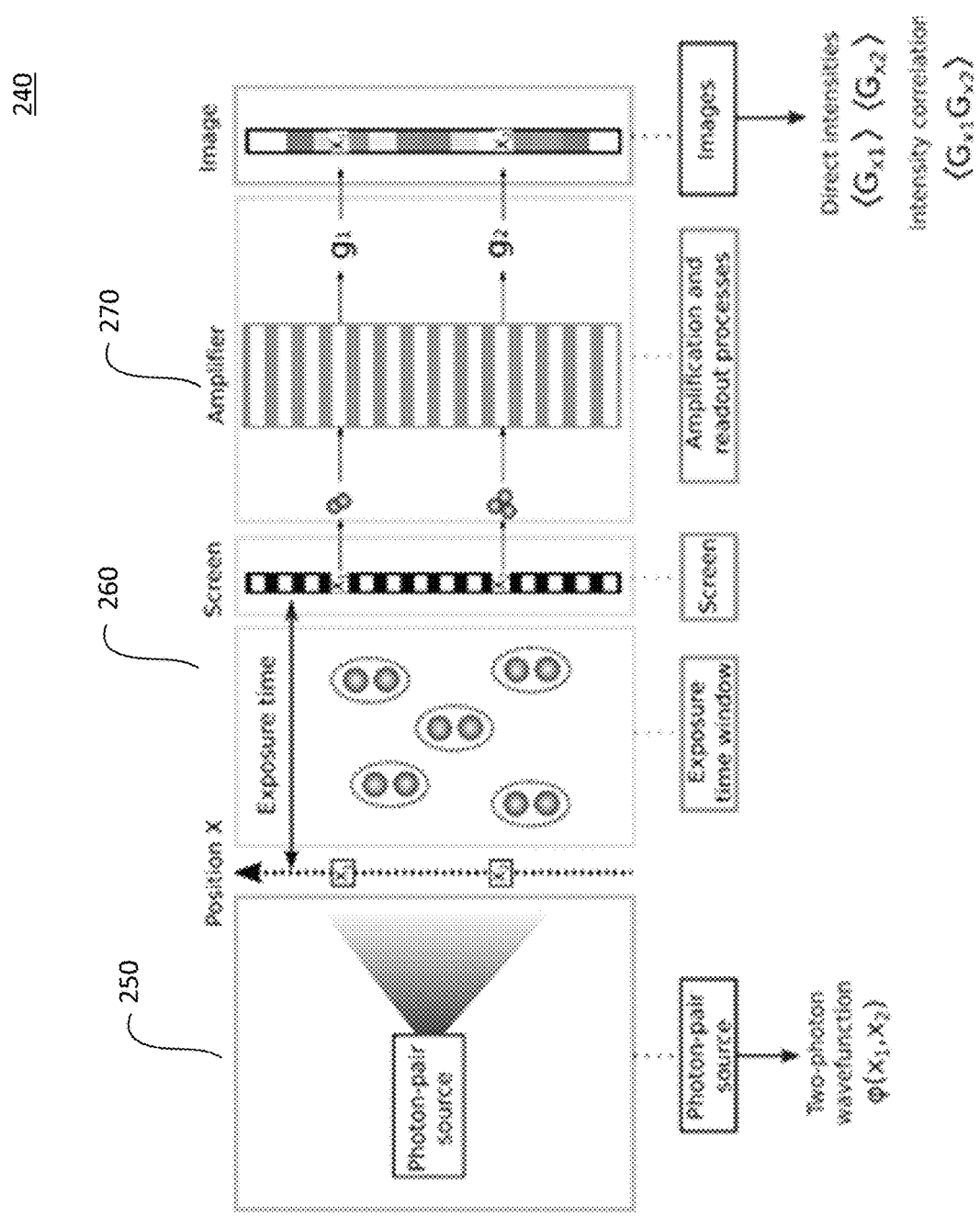
FIGS. 4a-4d depict block diagrams of quantum information processing system measurements associated with the system of FIG. 3.

FIG. 4a illustrates a system 240 for detecting photon-pairs. In one embodiment, the system 240 includes a photon-pair source 250, a detection system 260 and an amplification system 270. In one embodiment, the photon-pair source 250 is characterized by the two-photon wave function of the pairs $\phi(\vec{r}_1, \vec{r}_2)$. The detection system 260 includes a photo-sensitive screen. Further, the amplification system 270 is characterized by the quantum efficiency of the screen $\eta$, the conditional probability P(g|k), retuning a grey value g given k photo-electrons generated at the screen, and the exposure time $\tau$. Further, the direct $\langle G \rangle$ and correlation image $\langle G_1 G_2 \rangle$ are returned by the system at the end of an acquisition.

The direct $\langle G \rangle$ and correlation image $\langle G_1 G_2 \rangle$ may be expressed as a function of the joint probability distribution of the pairs $|\phi(\vec{r}_1, \vec{r}_2)|^2$, the quantum efficiency $\eta$, the conditional probability distribution P(g|k), the pair rate $\langle M \rangle$, and the exposure time window $\tau$, as:

$$\langle G \rangle = F(|\phi|^2, P(g|k), \eta, \langle M \rangle, \tau), \text{ and} \qquad \text{Equation 1}$$

$$\langle G_1 G_2 \rangle = F'(|\phi|^2, P(g|k), \eta, \langle M \rangle, \tau), \qquad \text{Equation 2}$$

where F and F' are two known functions. The strength of the model above is in its universality and it can be used for various types of multi-element detection devices once its internal properties (e.g., quantum efficiency $\eta$ and its amplification process P(g|k)) are known. For example it may be applied to an array of photodetectors, an EMCCD camera, a CMOS camera, a cell camera, or the like. In the case of an EMCCD camera, the quantum efficiency is given by the constructor and the conditional probability by P(g|k), which can be measured experimentally by performing a noise calibration measurement.

In one embodiment, retrieving the joint probability distribution of the photon-pairs $|\phi|^2$ from images returned by the detection system relies on the possibility of inverting equations 1 and 2 to obtain an analytical expression of:

$$|\phi|^2 = F''(\langle G \rangle, \langle G_1 G_2 \rangle, P(g|k), \eta, \langle M \rangle, \tau), \qquad \text{Equation 3}$$

where F" is a function that has to be determined.

In one embodiment, a thresholding process is applied to the output of the detector. For example, for an EMCCD camera, on each acquired frame, the value of a given pixel is set to 0 if it is determined to be below a threshold value and set to 1 when it is determined to be above the threshold value. Further, Equation 1 may be simplified by the thresholding processing and one of the simplification relying on the fact that an integrated form of the conditional probability P(g|k) can be considered as:

$$I(k) = \int_T^{+\infty} P(g|k) dg \qquad \text{Equation 4}$$

In one embodiment, an EMCCD camera provides high amplification and low temperature control, and the choice of some specific values of the threshold T allows for the approximation: $I(k) \approx 1$ if $k \geq 1$. Error introduced by this approximation is very small and can be estimated and the joint probability distribution $|\phi|^2$ can be written in the form:

$$|\phi(\vec{r}_1, \vec{r}_2)|^2 = \frac{1}{2\eta^2 \langle M \rangle \tau} \ln \frac{1 + \langle G_{\vec{r}_1} G_{\vec{r}_2} \rangle - \langle G_{\vec{r}_1} \rangle - \langle G_{\vec{r}_2} \rangle}{(1 - \langle G_{\vec{r}_1} \rangle)(1 - \langle G_{\vec{r}_2} \rangle)}, \qquad \text{Equation 5}$$

where $$\langle G_{\vec{r}_1} G_{\vec{r}_2} \rangle$$

is the value of the correlation between the pair of pixels located at positions $(\vec{r}_1, \vec{r}_2)$ in the correlation image $\langle G_1 G_2 \rangle$, and $$\langle G_{\vec{r}_1} \rangle$$

and $$\langle G_{\vec{r}_2} \rangle$$

are direct intensity values at pixels located a positions $\vec{r}_1$ and $\vec{r}_2$. Further, the quantities $\eta$, $\langle M \rangle$ and $\tau$ contribute as a general scaling factor.

Further, in various embodiments, using Equation 5, it is possible to reconstruct the joint probability distribution $|\phi(\vec{r}_1, \vec{r}_2)|^2$ represented by a 4-dimensional matrix, from the direct and correlation image measured.

In a discretized version, appropriate for pixels on a CCD array, this can be expressed as:

$$\Gamma_{ij} = \int\int_{-w/2}^{w/2} |\psi(\rho_1 - \rho_i, \rho_2 - \rho_j)|^2 d^2\rho_1 d^2\rho_2. \qquad \text{Equation 6}$$

where w is the width of the square pixels at positions ($\rho_i$, $\rho_j$). The marginal distribution is:

$$\Gamma_i = \sum_j \Gamma_{ij} = \int_{-w/2}^{w/2} \left[\int |\psi(\rho_1 - \rho_i, \rho_2)|^2 d^2\rho_2\right] d^2\rho_1. \qquad \text{Equation 7}$$

In some embodiments, it is possible to write the single-mode count probability as follows:

$$\langle C_i \rangle = \sum_m P_m(\mu_{i|m} + p_{el}\mu_{i|m}). \qquad \text{Equation 8}$$

where the brackets < > indicate an average over all recorded frames. Here, $P_m$ is the distribution of the number m of photon pairs and $p_{el}$ is the electronic count probability (e.g., dark counts). The factors $\mu_{i|m}$ and $\mu_{\bar{i}|m}$ represent the probability of detecting at least one photon and zero photons given m pairs arrive within the detector time window, respectively (see Table 1).

TABLE 1

| Term | Expression |
|---|---|
| $\mu_{i|m}$ | $1 - \mu_{\bar{i}|m}$ |
| $\mu_{\bar{i}|m}$ | $(1 - 2\eta\Gamma_i + \eta^2 \Gamma_{ii})^m$ |
| $\mu_{ij|m}^{pair}$ | $1 - (1 - 2\eta^2 \Gamma_{ij})^m$ |
| $\mu_{ij|m}^{cross}$ | $(1 - 2\eta^2 \Gamma_{ij})^m + \mu_{\bar{ij}|m} - \mu_{\bar{i}|m} - \mu_{\bar{j}|m}$ |
| $\mu_{i\bar{j}|m}$ | $\mu_{\bar{j}|m} - \mu_{\bar{ij}|m}$ |
| $\mu_{\bar{ij}|m}$ | $(1 - 2\eta(\Gamma_i + \Gamma_j) + \eta^2(\Gamma_{ii} + \Gamma_{jj} + \Gamma_{ij}))^m$ |

In the typical case where the duration of both exposure and read out of each frame of the EMCCD is much longer than the biphoton correlation time, photons from each pair arrive at the camera within a single frame. The coincidence probability between modes i and j can then be written as follows:

$$\langle C_{ij} \rangle = \sum_m P_m (\mu_{ij|m}^{pair} + \mu_{ij|m}^{cross} + p_{el}(\mu_{i\bar{j}|m} + \mu_{\bar{i}j|m}) + p_{el}^2 \mu_{\bar{ij}|m}) \quad \text{Equation 9}$$

where the $\mu_{pq|m}$ terms are 1) coincidences between at least one genuine entangled photon pair, 2) photons from different pairs, 3) photons and electronics noise events, and 4) two noise events (see Table 1 for details).

In one embodiment, the generated photon pairs obey a Poissonian number distribution. In this case, Equation (9) becomes $$\langle C_{ij} \rangle = 1 - (1-p_{el})(e^{-\langle n \rangle \Gamma_i} + e^{-\langle n \rangle \Gamma_j}) + (1-p_{el})^2 e^{-\langle n \rangle (\Gamma_i + \Gamma_j - \Gamma_{ij})} \quad \text{Equation 10}$$

if the two photons arrive in different pixels i and j and $$\langle C_{ij} \rangle = 1 - (1-p_{el})(e^{-\langle n \rangle (2\Gamma_i - \Gamma_{ii})} + e^{-\langle n \rangle (2\Gamma_j - \Gamma_{jj})}) + (1-p_{el})^2 e^{-\langle n \rangle ((2\Gamma_i - \Gamma_{uu}) + (2\Gamma_j - \Gamma_{jj}) - 2\Gamma_{ij})} \quad \text{Equation 11}$$

if they arrive in the same pixel.

To account for sub-unity quantum efficiency η of the detector array we may make the following substitutions:

$$\Gamma_i \rightarrow \eta \Gamma_i$$

$$\Gamma_{ij} \rightarrow \eta^2 \Gamma_{ij} \quad \text{Equation 12}$$

We can then write Equation (11) as follows:

$$\langle C_{ij} \rangle = \langle C_i \rangle + \langle C_j \rangle - 1 + (1 - \langle C_i \rangle)(1 - \langle C_j \rangle) e^{\langle n \rangle \eta^2 \Gamma_{ij}} \quad \text{Equation 13}$$

Equation (13) can be solved to give the joint probability distribution in terms of time-averaged observables:

$$\Gamma_{ij} = \alpha \ln\left(1 + \frac{\langle C_{ij} \rangle - \langle C_i \rangle \langle C_j \rangle}{(1 - \langle C_i \rangle)(1 - \langle C_j \rangle)}\right) \quad \text{Equation 14}$$

where $\alpha = 1/(\langle n \rangle \eta^2)$ for incidence on separate pixels and $\alpha = 1/(2\langle n \rangle \eta^2)$ for incidence on the same pixel. This is the same form as Equation (5).

Equation (14) contains products of the count probabilities. It is therefore straightforward to generalize to higher orders of joint probability i, j, ... n for n entangled photons.

Figure 4B:
Figure 4B:
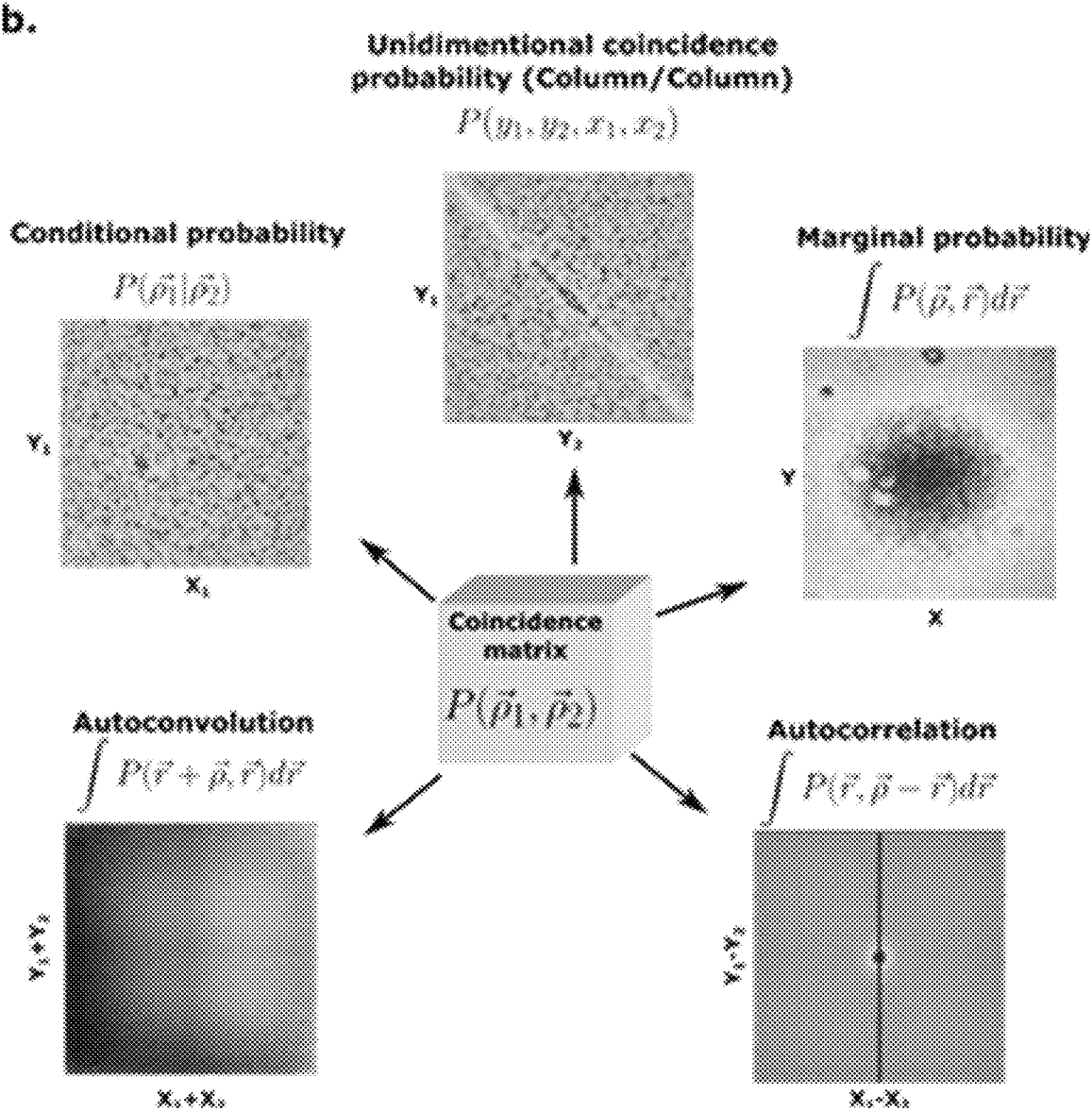

In one embodiment, the 4D-coincidence matrix (5) contains a large amount of information. FIG. 4b illustrates the reconstruction of a 4D-coincidence matrix in the case of a two-photon state.

As illustrated the conditional probability image $P(\vec{\rho}_1|\vec{\rho}_2)$ represents the probability of detecting one photon at position $\vec{\rho}_1$ while the other is detected at position $\vec{\rho}_2$. Further, the marginal probability image $\int P(\vec{\rho}, \vec{r}) d\vec{r}$ represents the probability of detecting a photon at position $\vec{\rho}$. The marginal probability image is very similar to the direct image $\langle G \rangle$.

Figure 4C:
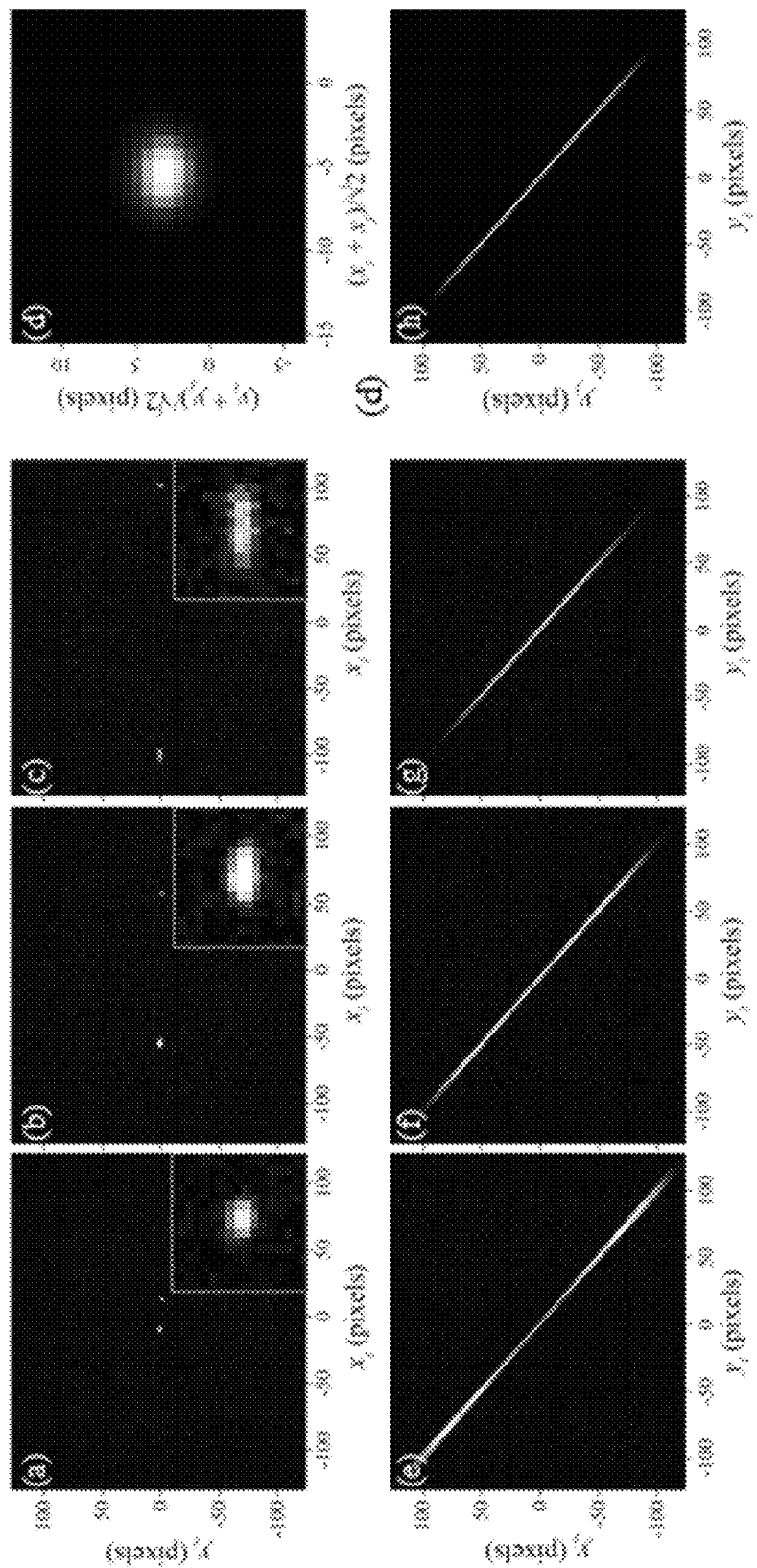

FIG. 4c illustrates an unidimensional coincidence probability image $P(y_1, y_2, x, x+1)$ which represents the coincidence probability matrix between two adjacent columns x and x+1 of the sensor. In one embodiment, the matrix reconstructed is a 2D-coincidence matrix and the chosen column is x=32. The intense diagonal shown in FIG. 2c highlights the strong correlation in position of the pairs.

Further, FIG. 4b also illustrates the autocorrelations image $\int P(\vec{r}, \vec{\rho} - \vec{r}) d\vec{r}$ and the autoconvolution image $\int P(\vec{r} + \vec{\rho}, \vec{r}) d\vec{r}$ correspond to averaging the 4D-coincidence matrix onto its hyper-diagonal $\vec{\rho} - \vec{r}$=cste or hyper-antidiagonal $\vec{\rho} + \vec{r}$=cste. In various embodiments, autocorrelation or autoconvolution images do not necessarily contain relevant information for a state with a general form of $|\phi(\vec{r}_1, \vec{r}_2)|^2$. In some embodiments, the autoconvolution image does not show any relevant pattern. However, in some embodiments, the autocorrelation image reveals strong spatial correlation between the pairs. As such, correlations are detected between every pair of pixels that are separated by less than approximatively 4 pixels (vertically or horizontally). Further, the SNR of the autocorrelation image is much higher than the SNR of the 4D-matrix as the very symmetric form of the two-photon wavefunction in this experimental configuration and the autocorrelation image is obtained by averaging over a hyper-diagonal of the 4D-matrix that preserves this symmetry.

In various embodiments, system 200 is configured to measure a large set of frames at a constant exposure time. At the end of an acquisition of the set, two images are returned at the output: a direct image and a correlation image. The direct image $\langle G \rangle$ is obtained by averaging the output values measured at each pixel over the total number of frames acquired. The correlation image $\langle G_1 G_2 \rangle$ is a 4-dimensional image obtained by multiplying pixel of each image by pair and averaging over the total number of frame acquired.

In one embodiment, that entangled photon pairs are always found near equal and opposite sides of the center of the spatially averaged intercorrelation function. The projection averages the variations in the shape of the conditional distributions with radius.

Figure 4D:
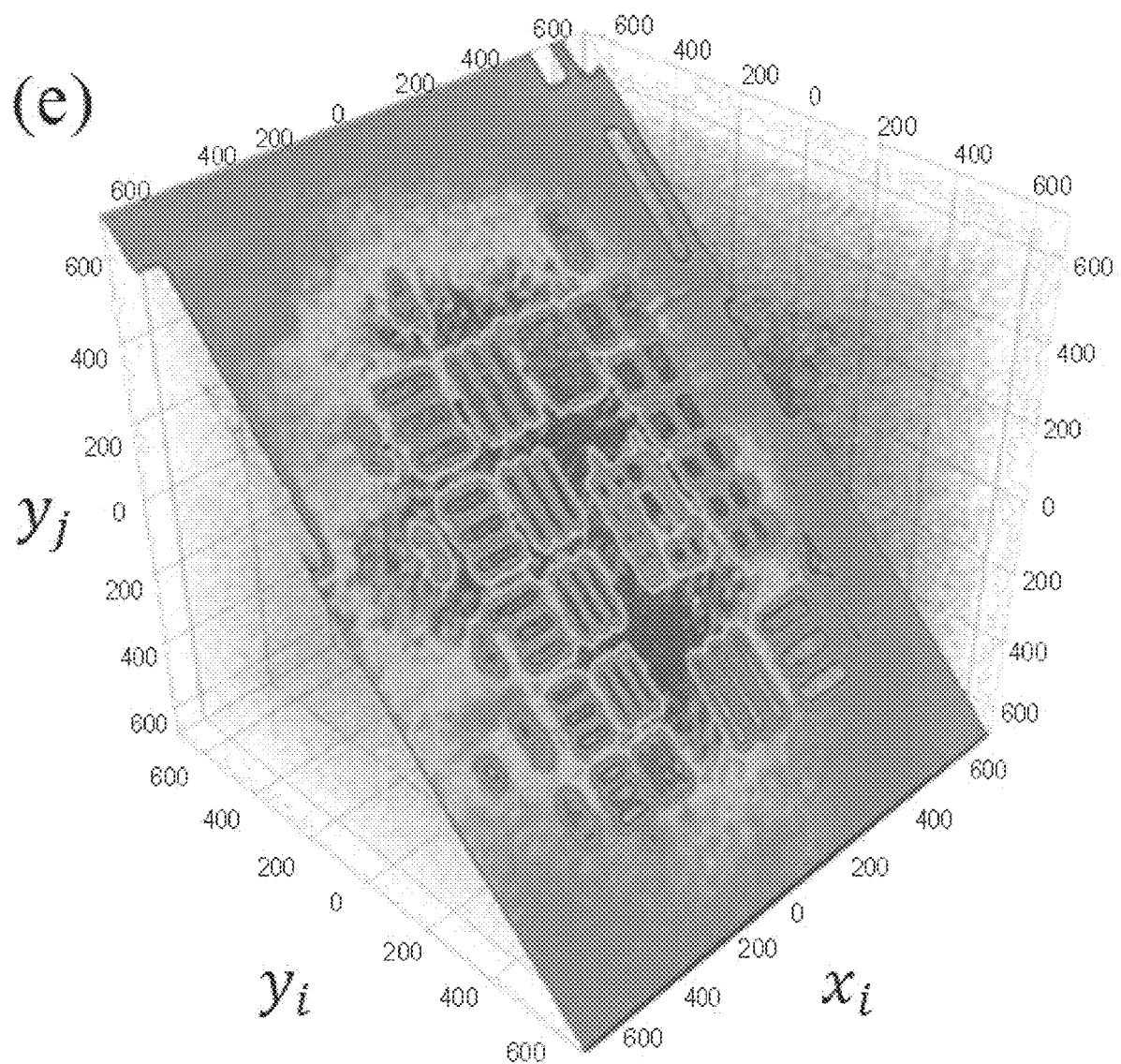
Figure 4D:
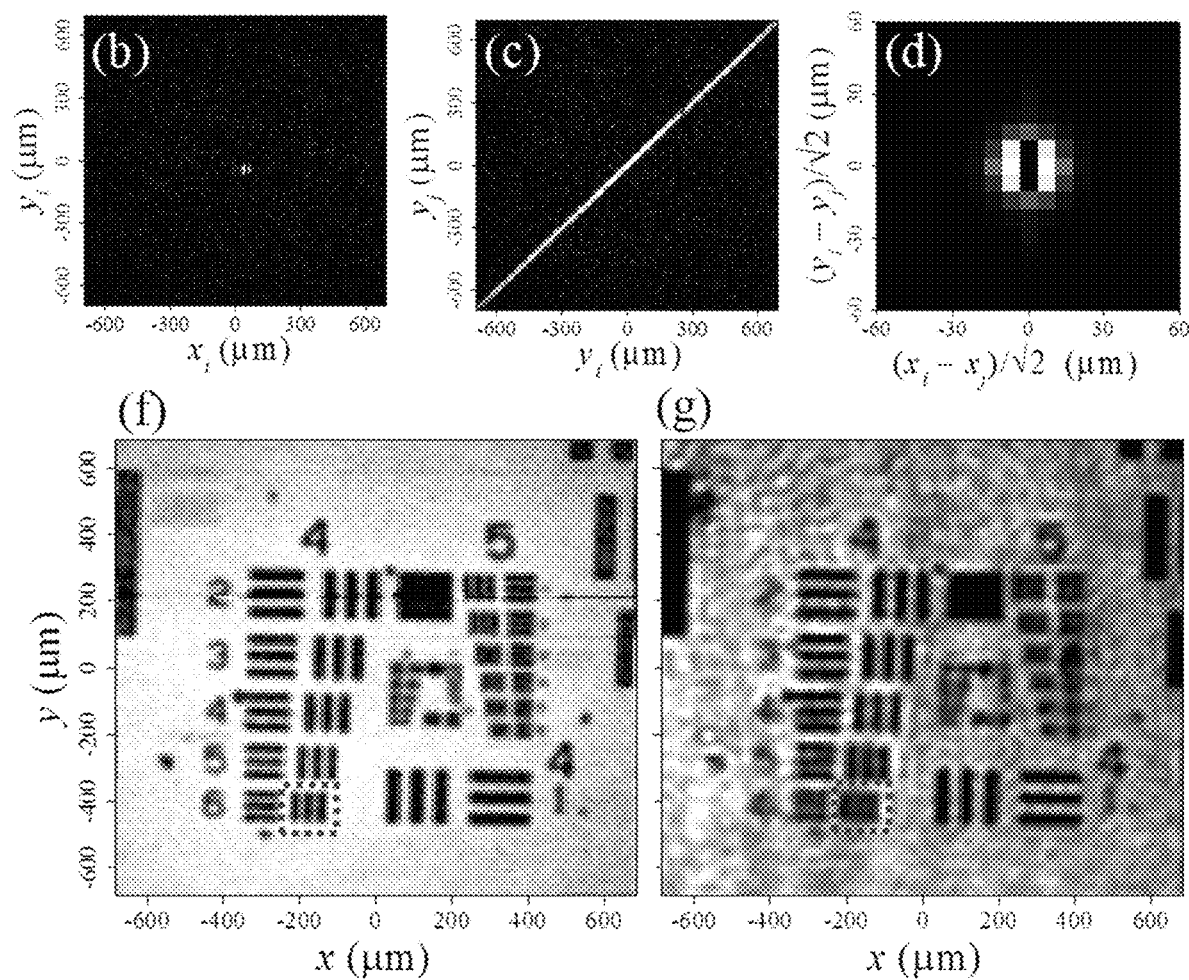
Figure 4D:
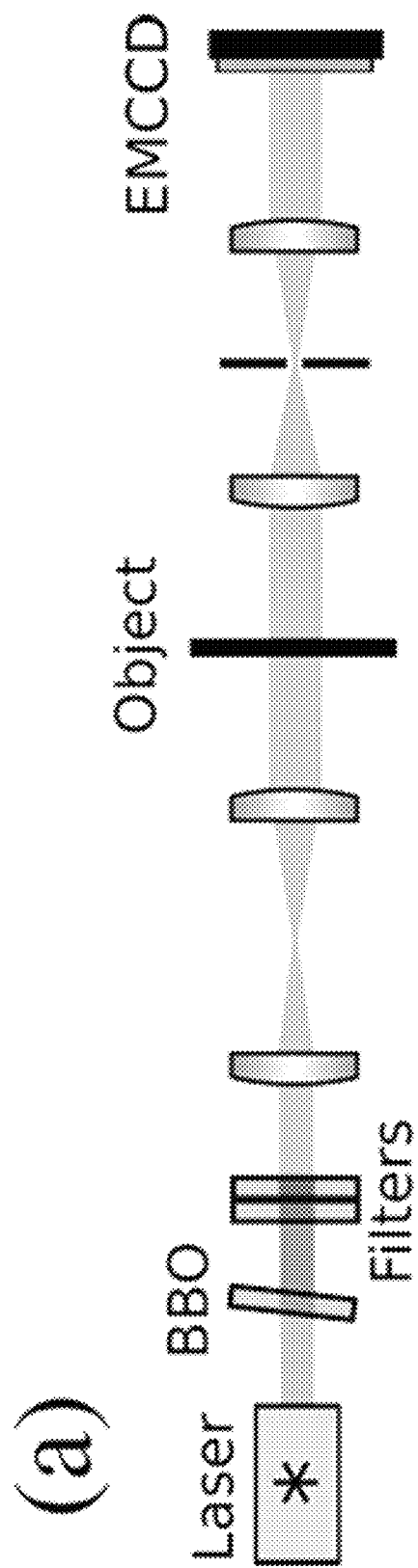

FIG. 4d illustrates conditional distributions for three different radii from the center. s $x_j$ is increased, $x_i$ decreases to maintain a fixed sum (anti-correlation), as expected. However, there is also a variation in the shape of the conditional distributions; the width along the radial direction increases with $x_i$. This arises from the proportionality of the projection of the uncertainty in the wave vector k in the radial direction with radius $\Delta k_\rho \approx k_\rho |\Delta k|/|k|$. Observing such features with point-scanning detectors requires multiple separate measurements, while they are fully captured in a single EMCCD measurement of $\Gamma_{ij}$.

FIG. 4d further illustrates the project of $\Gamma_{ij}$ onto the sum of coordinates $[(x_i + x_j)/\sqrt{2}, (y_i + y_j)/\sqrt{2}]$, which is the spatially averaged intercorrelation function in momentum. The peak near the center indicates that entangled photon pairs are always found near equal and opposite sides of the center. This projection averages the variations in the shape of the conditional distributions with radius, yielding in this embodiment a globally averaged correlation widths σ_(y,+)=18.6±0.3 μm and σ_(x,+)=20.9±0.3 μm; the corresponding width of the conditional distributions vary as in FIG. 2d, with $\sigma_{x,+}$ of 16.1±1.4 μm, 23.0±1.5 μm, and 34.9±2.5 μm, respectively.

Other slices of $\Gamma_{ij}$ contain different information about the entangled photon pairs. For example, rather than fixing [$x_j$, $y_j$] to examine conditional distributions, we may instead fix $x_i$ and $x_j$ to observe correlations in vertical position. Such information is obtained via coincidence measurements performed by scanning pairs of single photon counting modules in vertical lines. Examples shown in FIG. 4d show strong anti-correlation of variable width, each taken at different [$x_i$, $x_j$]. The effect of the radial variation in the conditional width can be seems most evidently in FIG. 4d where [$x_i$, $x_j$]=[1, 0], where the width of the vertical anti-correlation increases with |y|. This variation is diminished for larger |x|, due to the ring structure and radial elongation of the conditional distributions. This variation in vertical correlation is averaged out in the projection of $\Gamma_{ij}$ onto [$y_i$, $y_j$] shown in FIG. 4d, as would be measured with scanning horizontal slits with single photon counting modules. Thus, full 4D biphoton measurements with an EMCCD may provide much more information on the structure of $\gamma_{ij}$ which may be lost with traditional techniques.

In one embodiment, the massively parallel capability of the EMCCD camera allows for rapid measurement of joint probability distributions compared to traditional raster scanning techniques. Raster scanning pairs of single-photon counters each in a $\sqrt{D}$ pixel plane to build up an image requires D measurements. Further, EMCCD cameras may be configured to measure the entire plane simultaneously with pixels at each point in the array.

Single photon counting modules outperform single pixel measurements with an EMCCD camera (D=2), due to their high effective frame rate (10's of MHz). However, the measurement times of each scale differently with dimension D. Raster scanning single photon counting modules scales linearly with the D, while, for a square frame, measurements with an EMCCD are limited by the camera frame rate which scales as $D^{1/4}$. Further, for an EMCCD camera, a definitive speed advantage is found for D>(24×24)²≈330,000. In various embodiments, the use of the full camera allows up to (1024×1024)²≈one trillion dimensional Hilbert space. At 26 frames per second, measurements of $\Gamma_{ij}$ could achieve a signal-to-noise ratio of 10 in approximately 11 hours. Such a measurement with point-scanning detectors, is estimated to take 9 years, showing improvement by a factor of 7000. Furthermore, the EMCCD camera also outperforms compressive sensing methods for large Hilbert spaces. It also makes no sparsity assumption on $\Gamma_{ij}$ and does not require numerical retrieval.

As a demonstration of the potential of this technique for quantum imaging applications, we compare the imaging resolution between entangled photon measurements to classical coherent light. As shown in FIG. 4d, the output face of the crystal is imaged onto a USAF resolution chart and then imaged onto the camera. An adjustable iris is placed in a Fourier plane to control the numerical aperture. Biphotons exhibit spatial correlation in the near field, where one photon is localized near its pair, i.e., j≈i. $\Gamma_{ij}$ shows strong spatial correlation, visible in both conditional images and the projection onto the difference of coordinates. By fitting to a Gaussian distribution, the correlation width σ_=8.5±0.5 μm.

With a full field measurement of $\Gamma_{ij}$, the spatial properties of the entangled photon pairs may be characterized based on a USAF resolution chart. A 3D projection of $\Gamma_{ij}$ if in FIG. 4d shows both spatial correlation of the biphotons and imaging of the resolution chart. Such images provide a clear visualization of both the variation in both the distribution and spatial correlation of entangled photon pairs. Furthermore, such measurements provide improved resolution compared to classical coherent light. Imaging with perfectly correlated photon pairs with biphoton wave function $\psi(\rho_i,\rho_j)=\delta(\rho_i-\rho_j)$, with a probability distribution of both photons at the same position in the image plane of:

$$\Gamma(\rho,\rho) \propto |\int t^2(\rho')h^2(\rho-\rho')d\rho'|^2,$$ Equation 6 where t(ρ) is the object transmittance and h(ρ) is the point spread function of the imaging system. The point spread function h²(ρ) of highly correlated biphotons is narrower than h(ρ) of classical coherent light, meaning biphoton imaging has higher resolution. Coincidence images taken with entangled photon pairs illustrate a clear improvement in resolution over those taken with classical coherent light from a 808 nm laser diode, with higher visibility of fine features.

As such, the massively parallel coincidence capability of an EMCCD camera offers a many thousand-fold speed up in measurements the full joint probability distribution of entangled photon pairs in a large dimensional Hilbert space compared to traditional raster-scanning methods. This makes accessible complex highly entangled states over very large Hilbert spaces, which thus far would have taken prohibitive long to measure.

Furthermore, in various embodiments, this method may be applied to degrees of freedom other than transverse spatial modes, such as spectral modes or orbital angular momentum, by mapping onto the pixels of the camera.

In one embodiment, the EMCCD is a highly sensitive camera where there is an avalanche gain of up to 1000 within each pixel that amplifies the signal before readout. The camera has a pixel size of 16×16 μm² with a quantum efficiency of ~70% at 800 nm. To minimize the dark-count rate the temperature is operated at −85° C., such that it is negligible compared to other noise sources in the camera. The histogram of the gray scale output of each pixel from many frames taken with the shutter closed may be measured.

In one embodiment, the histogram is primarily Gaussian due to read-noise, with an additional exponential tail towards high gray levels due primarily to clock-induced charge (CIC) noise. A histogram with a Gaussian distribution to find this center (~170) and standard deviation σ (4 to 20, depending on the read-out rate) may be fit. Further, a threshold set to 1.9σ above the mean maximizes the signal-to-noise ratio (SNR) and a pixel dependent threshold may be used to account for a minor inhomogeneity across the frame.

Operating at higher readout rate may increase σ and CIC noise. However, the increased acquisition rate may compensate for these effects and yields a higher SNR for the same acquisition time. In one embodiment, the camera is operated at horizontal read out rate of 17 MHz, and a vertical shift time of 0.3 μs, with a vertical clock voltage of +4 V. The pump laser power and exposure time are set to maximize the SNR, finding an optimum mean count rate ⟨C⟩ of ~0.2. A region of interest that contains all or most of the SPDC and acquire a number of frames sufficient to achieve the desired SNR may be selected. In many embodiments, a series of ~$10^5$-$10^7$ images are acquired at a ~1-5 ms exposure time.

In one example embodiment, many sets of thresholded frames are saved, where each set contains 104 frames as logical array $C_{i,n}$. Each column of the array represents a single frame, and each row represents a pixel. $\langle C_{ij} \rangle$ may be calculated by matrix multiplication of each set of frames, which are then averaged. To minimize non-ergodic effects, the term $\langle C_i \rangle \langle C_j \rangle$ may be calculated via matrix multiplication of successive frames. Further, $\langle C_i \rangle$ is the average of all frames.

The biphoton wave function in an image plane may be given by:

$$\psi_{img}(\rho_i,\rho_j)=\iint h(\rho_i-\rho_i')h(\rho_j-\rho_j')\cdot t(\rho_i')t(\rho_j')\psi_s(\rho_i',\rho_j') d\rho_i'd\rho_j', \quad \text{Equation 7}$$

where $\psi_s(\rho_i,\rho_j)$ is the wave function incident on the object. With ideally correlated photon pairs, i.e., $\psi_s(\rho_i,\rho_j)=\delta(\rho_i-\rho_j)$.

In various embodiments, as the EMCCD is not photon number resolving, both photons hitting the same pixel may be distinguished and therefore do not measure $\Gamma_{ii}$. Instead where there are two entangled photons arrive in adjacent pixels, i.e., $x_j=x_i+1$. In one or more embodiments, for ideal imaging, coherent radiation intensity images are directly proportional to $|t(\rho)|^2$, where $t(\rho)$ is the transmission complex (field) function, while for entangled-photon images $\Gamma_{ij} \propto |t(\rho)|^4$.

In certain embodiments, there is a small cross-talk effect between pixels in a single column due to sub-optimal charge transfer efficiency upon readout. For this reason, each 2D frame of $\Gamma_{ij}$ for fixed j, the 10 pixels above and below are set to zero i≠j.

Referring again to FIG. 1B, FIG. 1B shows an exemplary arrangement for isolating true two-photon measurements with a camera. It is based upon adjusting (configuring) the source crystal so that the separation distance in an entangled pair is roughly equal to the separation distance between two adjacent pixels. Accordingly, this involves arranging a source crystal at an angle so that the mean spread of the photon pair equals fixed pixel spacing on a CCD array. For example, the mean spread may be between nearest neighbor pixels. In one embodiment, two pixels that satisfy a separation distance threshold are more likely to be illuminated by photons from a single entangled pair than by photons from separate pairs. Thus, detection of nearest neighbor illuminated pixels evidences their illumination by entangled photon pairs.

As discussed above with reference to FIG. 1b, the light source may be adjusted or a lens may be arranged so that the mean spread of the photon pair equals fixed pixel spacing on a CCD array. For example, the mean spread may be between nearest-neighbor pixels. In one embodiment, two pixels that satisfy a separation distance threshold are more likely to be illuminated by an entangled photon pair in a single event than by two individual photons in different events. Thus, detection of nearest neighbor illuminated pixels evidences their illumination by entangled photon pairs.

In various embodiments, rotating the nonlinear crystal of the light source can set the expected separation distance of the entangled photon pair on the CCD array to nearest-neighbor pixels. Further, such a rotation of the crystal causes background photons, on average, to not register in nearest neighbors, even for extended exposure times. Therefore, quantum illumination can be post-selected from the measured data.

In one example embodiment, for a pair of entangled photons, the crystal can be rotated such that the entangled photon pair, on average, is set to arrive at nearest-neighbor pixels (red pixels). Further, background photons, in contrast, may be set to arrive in random locations (blue pixels). Filtering these nearest-neighbors then allows preferential post-selection of entangled photon pairs.

In various embodiments, this method can be generalized for arbitrary positions of pixels and for higher numbers of entangled photons.

In one embodiment, the joint probability distribution is measured in two or more different planes along the optical axis. This enables retrieval of phase information by comparing changes in the distribution (as measured in the different planes) due to propagation.

In one embodiment, the two measurement planes are a focused image and a defocused image, enabling comparison via transport of intensity and entanglement.

In one embodiment, the two measurement planes are the near field (by imaging) and the far field (by performing an optical Fourier transform). This gives a direct comparison between the position and momentum coordinates, respectively.

In one embodiment, information from the joint probability distribution is fed back into the spatial light modulator, so that modification of the beam depends on the quality of the beam itself. This feedback creates an effective nonlinearity. For example, spatial entanglement can experience nonlinear propagation through the combined physical-digital system.

Figure 6A:
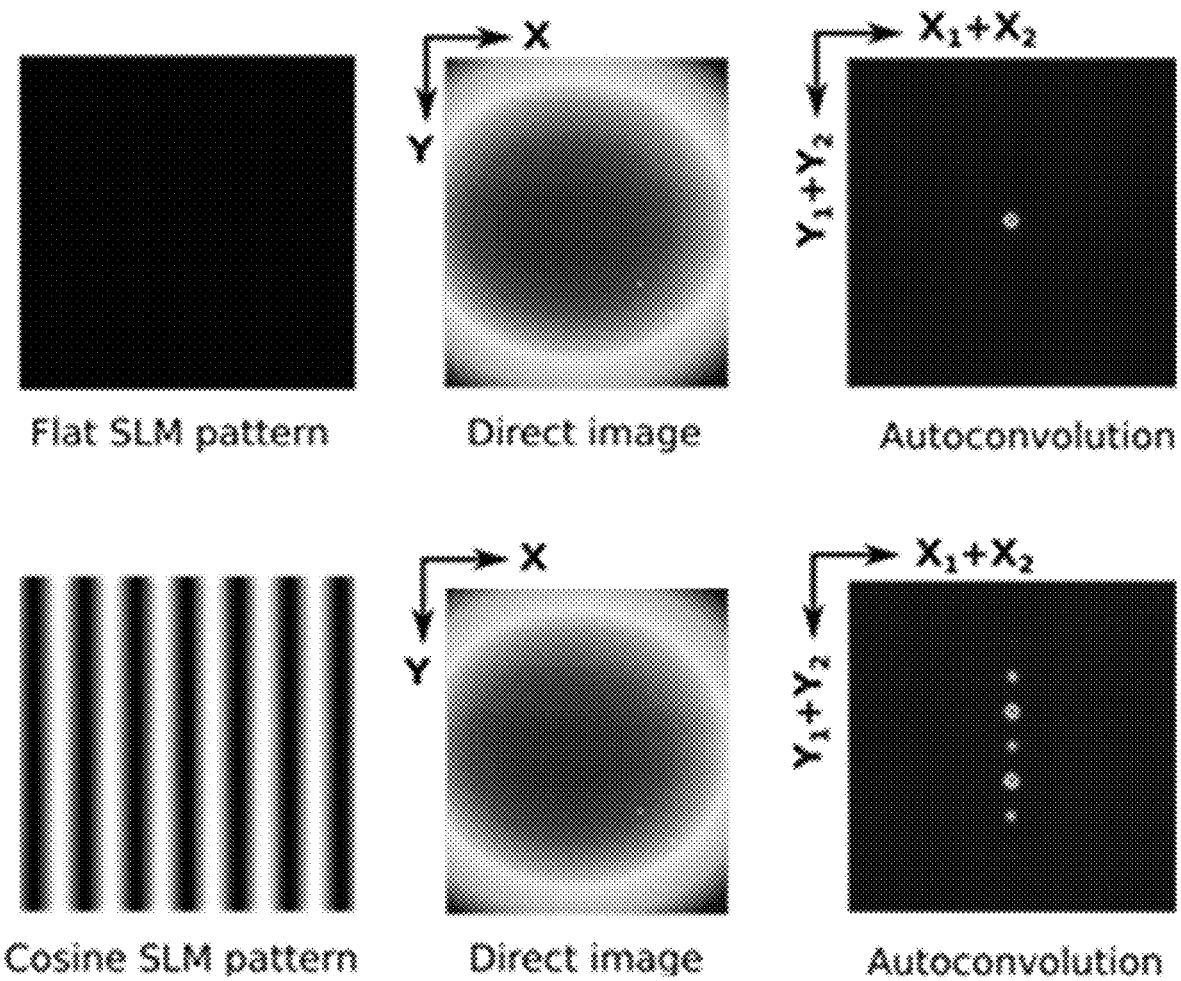
FIGS. 6a and 6b depict exemplary quantum information processing system measurements associated with the system of FIG. 5.

In many embodiments, the intensity of the beam is kept as near to uniform as possible while an SLM is configured to change the pattern of spatial entanglement. In one embodiment, shown in FIG. 6a, there is a cosine modulation of the phase, the pattern obtained is composed of multiple points along the same column, on both sides of the intensity point obtained with the flat SLM pattern. In such an embodiment, correlation properties (i.e. entanglement) have been modified and when a photon is detected at the reference position (Xr=48,Yr=61), the other photon is now detected at one of these multiple positions, and not only at the symmetric one.

Figure 6B:
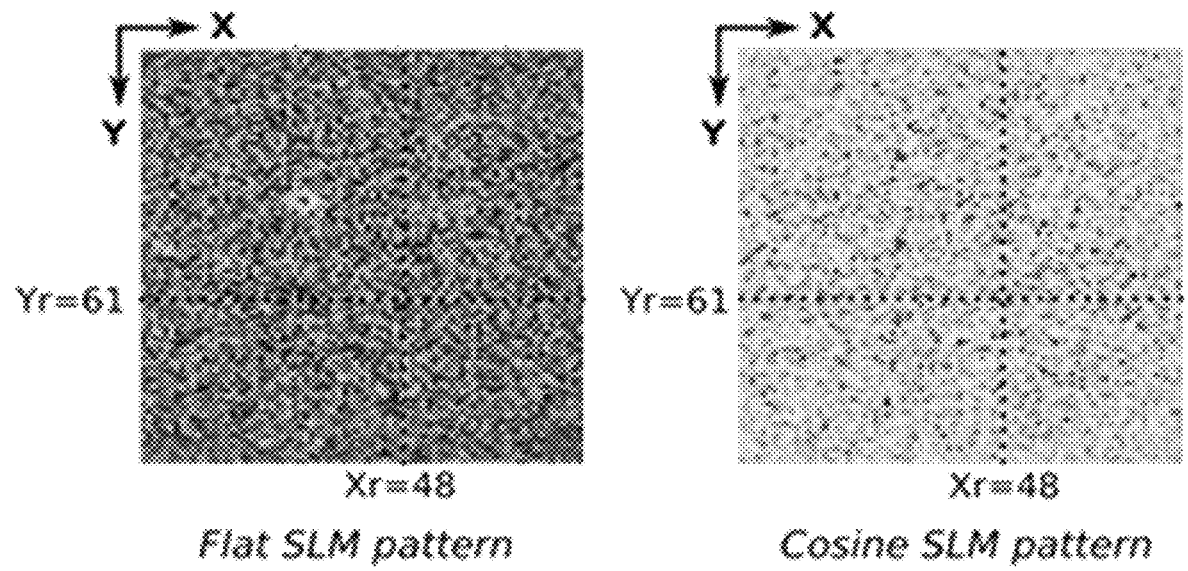
Figure 6B:
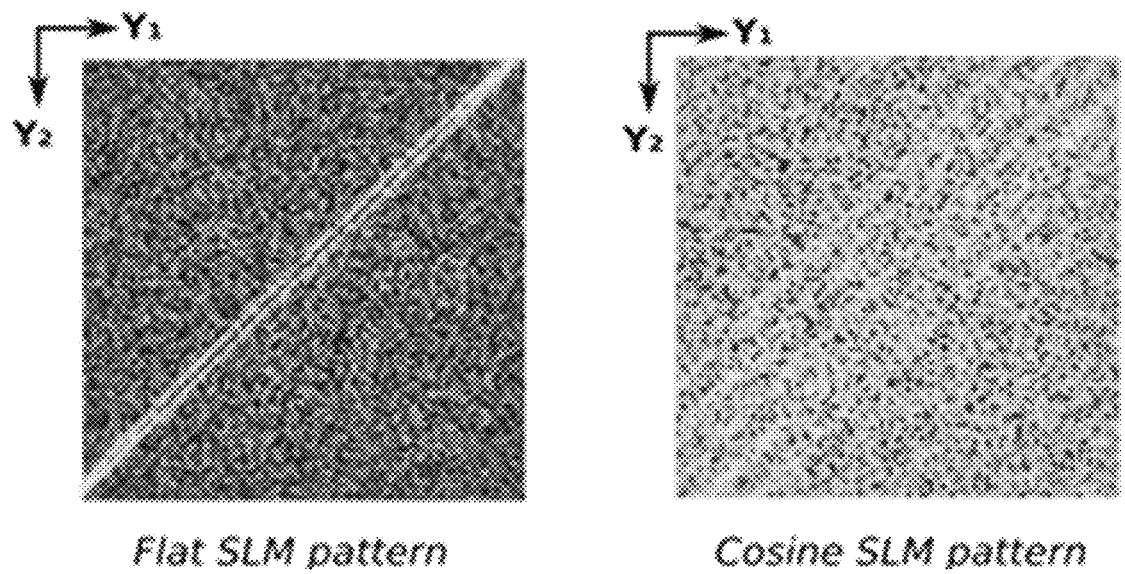

FIG. 6b further illustrates unidimensional coincidence matrices reconstructed between pixels of column 45 and column 33 of the camera sensor. The intense anti-diagonal of the matrix obtained with a flat SLM pattern highlights one more time the anticorrelated behavior of the pairs. The same coincidence matrix reconstructed using a SLM programmed with a cosine phase modulation reveals the more complex structure of the correlations described previously.

Figure 7:
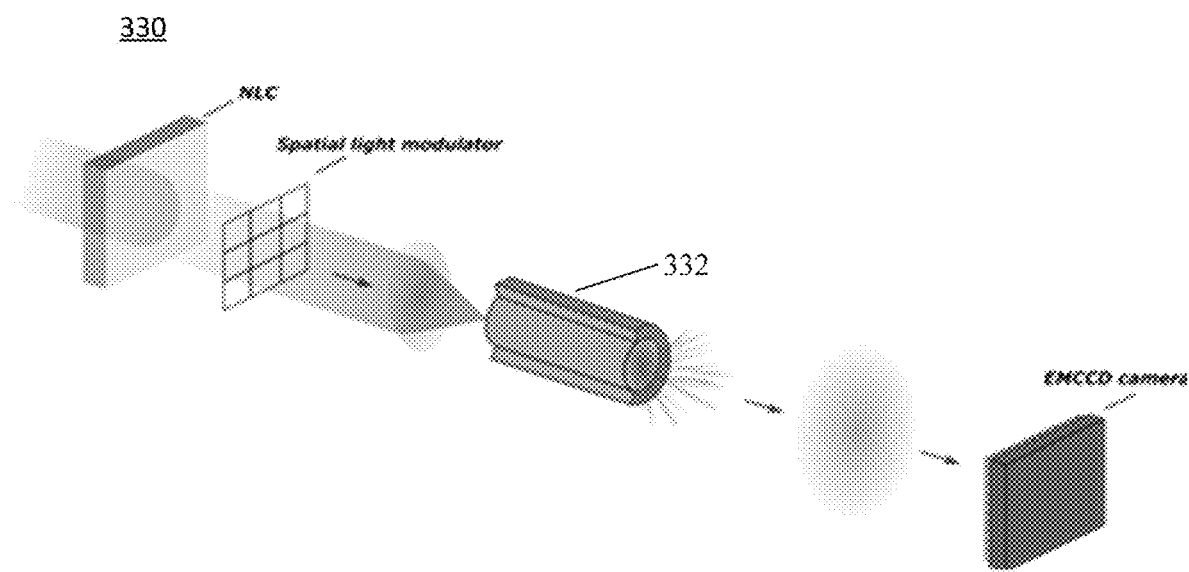
FIG. 7 is a block diagram of another alternative quantum information processing systems in accordance with one or more embodiments of the present invention.

FIG. 7 is a block diagram of another alternative quantum information processing systems in accordance with one or more embodiments of the present invention. In the embodiment of FIG. 7, a multimode fiber 332 is included within system 330. The multimode fiber 332 forms a port of a disordered media. When light propagates through a disordered system, spatial modes are mixed during propagation and any information encoded on the input positions, like an image or spatial entanglement profile, is mixed during propagation and cannot be retrieved in general at the output and cannot be retrieved in general at the output In the embodiment of FIG. 7, a spatial light modulator at the input may be adjusted to compensate for the scattering and mixing of the multimode fiber. This is useful for the transmission of information, such as images, and the control of entanglement. It is also useful for reservoir computing, in which the output depends sensitively on the condition of the input because of the high dimensionality of mode mixing (information exchange) within the scattering medium.

Figure 8:
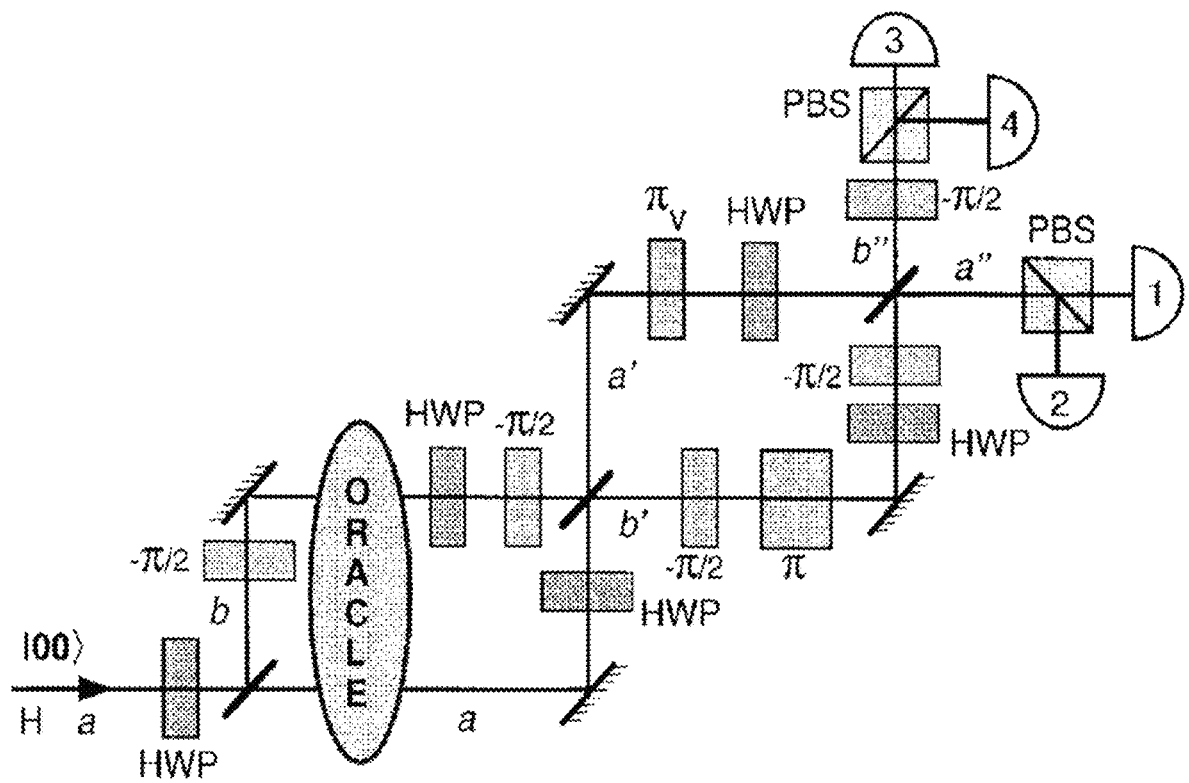
FIG. 8 is a block diagram of a prior art arbitrary-point spatial optical correlator.
Figure 9:
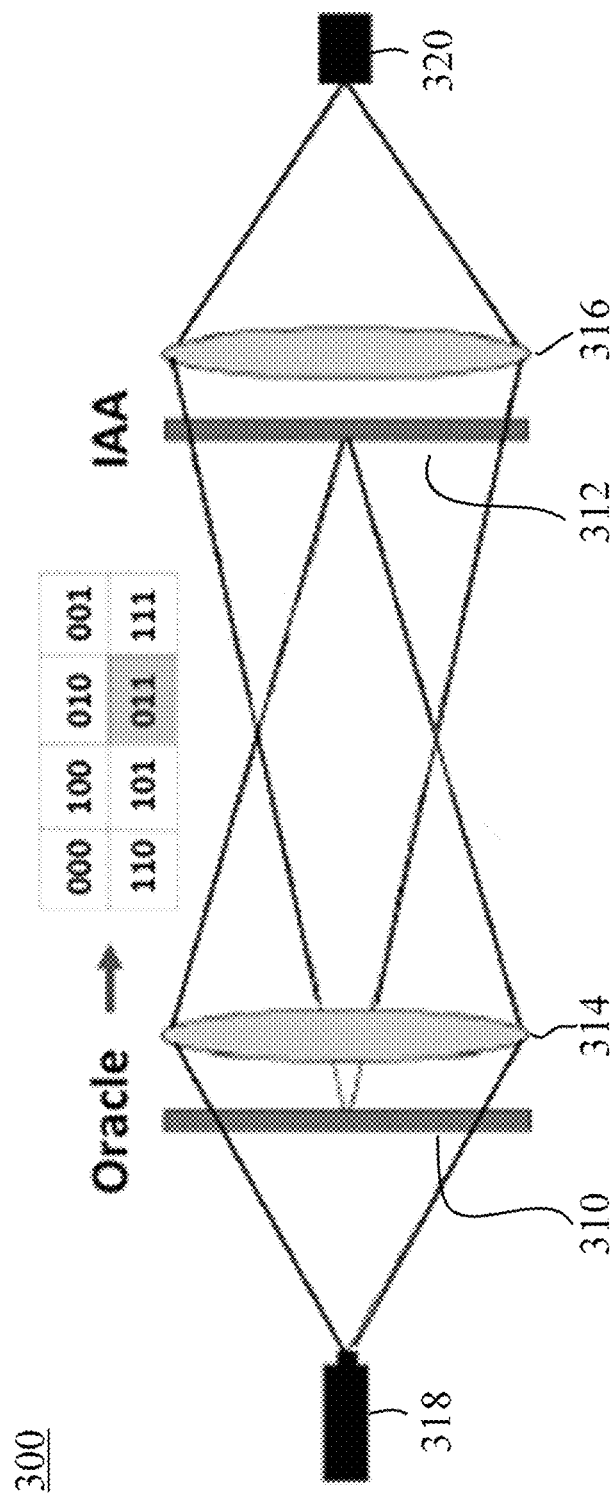
FIG. 9 is a block diagram illustrating a quantum information processing systems according to one or more embodiments of the present invention.

FIG. 8 is a block diagram illustrating an exemplary prior art arbitrary-point spatial optical correlator that can be used for QIP based upon polarization-entanglement. This exemplary arrangement comprises waveplates to control and measure the degree of polarization, and synchronized point detectors for coincidence detection. In this traditional photonic system, bits are encoded in polarization states and are detected with point detectors. As shown in FIG. 9, half-wave plates ("HWP") and polarizing beam splitters ("PBS") may be arranged to perform a desired quantum computation. This arrangement is disadvantageous in that in this arrangement there is a need for an increased number of optical elements and point detectors that does not scale well with increasing numbers of entangled photons (quantum bits).

In contrast, FIG. 9 illustrates a block diagram of a scalable system 300 for performing QIP. The system 300 includes SLM 310, SLM 312, lens 314, lens 316, light source 318 and detector 320. In one embodiment, SLMs (310 and 312) and lenses (314 and 316) are configured to control the properties of spatially extended continuous waves. In one embodiment, the SLMs receive selection information and select one or more corresponding pixels based on the selection information, such that the corresponding entangled photons are provided to the detector 320. For example, SLM 310 may be configured to shape the waveform (i.e., wavefront shaping) of an input beam of entangled photons and generate a uniform beam of entangled photons. In one embodiment, the SLM 310 encodes quantum bits within the uniform beam of entangled photons. The lens 314 maps the uniform beam onto the SLM 312. In one embodiment, the lens 314 performs an optical Fourier transform. Further, the SLM 312 may be configured to modulate the uniform beam generating a resultant beam which is mapped by lens 316 onto the detector 320. In one embodiment, the SLM 312 is configured to compare the Fourier modes and the lens 316 performs optical spatial filtering, selecting Fourier modes which are mapped to the detector 320.

Figure 3:
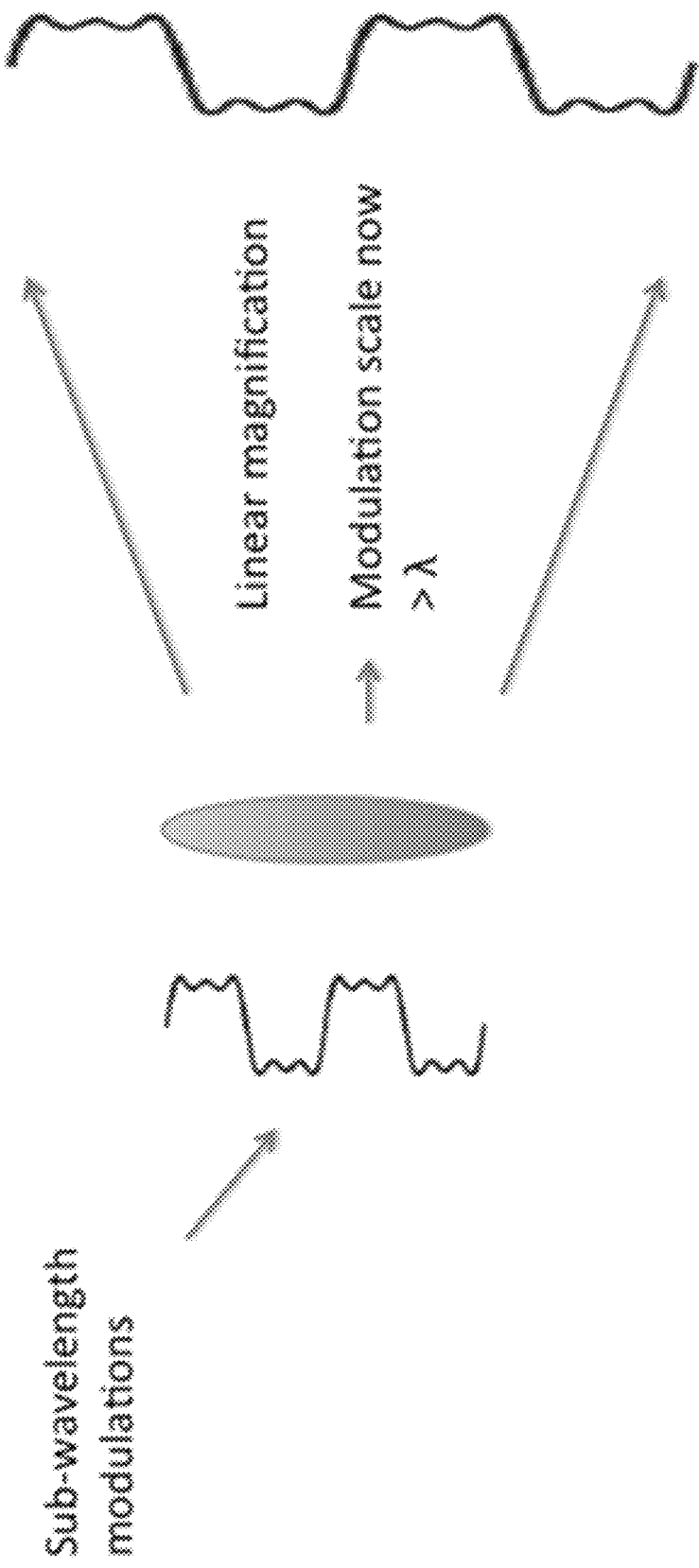
FIG. 3 is a schematic depicting operation of a quantum enlarger in accordance with one or more embodiments of the present invention.

In one embodiment, a system 300 is a 4-D imaging system images the output onto the SLM 310. The SLM 312 surface is then Fourier-imaged onto the detector 320 the lens 316. Further, the optical field detected by the detector 320 corresponds to the Fourier transform of the two-photon field at the output surface of the lens 316. In our experimental configuration, the crystal (e.g., BBO in FIG. 2(c) and element 328 in FIG. 3a) is slightly tilted to generate pairs in a collinear mode. The corresponding autoconvolution image shows an intense peak in its center, indicating an anti-correlated behavior of the pairs. In another embodiment, a cosine phase pattern (with a maximum of phase at π/2) is programmed onto the SLM 314. In one embodiment, the shape of the direct image does not change compared to the flat SLM pattern case, but the structure of the autoconvolution images is strongly modified.

The use of SLMs (310 and 312) and lenses (314 and 316) allows for the system 300 to support an increased number of input photons. For scaling, only the distribution of bits on the SLMs may change. In one embodiment, the SLMs and/or the detector each have about 10^6 pixels.

In one or more embodiments, a system for quantum information processing includes three or more SLMs and three or more lenses. In such embodiments, a first SLM may be configured to shape the waveform of an input beam of entangled photons and generate a uniform beam of entangled photons. Further, the first SLM is configured to encode quantum bits within the uniform beam of entangled photons. A first lens maps the uniform beam onto a second SLM that is configured to modulate the uniform beam to compare modes applied to the beam. In many embodiments, the modes to be compared are Fourier modes. A third SLM may be configured to amplify the difference between the modes. In many embodiments, an SLM is configured to perform optical spatial filtering, selecting Fourier modes, on the output of which are then mapped onto a detector via a lens.

In various embodiments, a detector may be one element of a detection system configured to detect and measure an arbitrary number of entangled photons. For example, the detection system may be configured to match the geometry of photon generation with the known pixel spacing on the array. As such, a purely spatial method based on geometry may be employed for measurement and detection of entangled photons. In such embodiments, temporal coincidence is converted into spatial localization.

FIG. 8 illustrates optical implementations of Grover's prior art search algorithm. In this algorithm, information is spread uniformly over the quantum bits (in the example of FIG. 9, 3 qubits). An "oracle" then determines the particular element that is to be found (in this example, 011). For this bit, an inverse amplitude amplification (IAA) is performed, which is a localized phase change on the desired bit followed by a magnification. The result is an increased probability of detection for the desired element, at the expense of the others.

Implementation of quantum algorithms includes the translation of existing quantum algorithms (such as Grover's search algorithm and Shor's method of factoring) to beam propagation as well as the development of new approaches to quantum computation. For the particular example of Grover's search algorithm for finding a particular state among an array of equally likely solutions in FIG. 4, this may be done in a series of steps. First, an "oracle" chooses which information element is to be found. Next, an "inverse amplitude amplification" step isolates the desired element by reversing its phase and amplifying its amplitude A about the mean μ, e.g., 2A−μ. Then, the process may be repeated until the probability of detecting the desired element is significantly more than that of the others. For the example here of 3 quantum bits, the optimal search is achieved when the algorithm is iterated twice.

The exemplary prior art photonic system (FIG. 8) is quite complex, with increasing numbers of optical elements and point detectors that do not scale well with increasing numbers of entangled photons (quantum bits). The new imaging system in accordance with the present invention of FIG. 9 is somewhat similar but differs in the distribution of bits on the SLMs. In an embodiment with ~$10^6$ pixels available on both the SLMs and the CCD camera, there is much room for increased information content before the physical limits are reached.

The power of the imaging system stems from both the ease of addressing the bits and the great simplicity of performing a Fourier transform using a lens. This decomposes the waveform at the speed of light, without the complexity of performing the quantum equivalent of register shifts of an FFT. As quantum Fourier transforms underlie all the important quantum algorithms, the direct imaging system has enormous potential for making quantum computation practical.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A system for quantum information processing comprising:
   a light source configured to provide a beam of entangled photons;
   a detector;
   at least one spatial light modulator (SLM) comprising a plurality of discrete pixels and configured to select one or more of said plurality of discrete pixels to generate a resultant beam from said beam of entangled photons; and
   at least one optical lens configured to project the resultant beam onto said detector, wherein said at least one SLM is configured to shape a waveform of said beam of entangled photons, wherein shaping said waveform of said beam of entangled photons comprises encoding quantum information onto said beam of entangled photons,
   wherein said at least one SLM comprises a first SLM and a second SLM, wherein said at least one optical lens comprises a first optical lens and a second optical lens,
   wherein said first optical lens is configured to perform an optical Fourier transform and said first SLM is configured to perform a spatial filter selecting Fourier modes,
   wherein a difference between respective measurements in at least two different optical planes is used to reconstruct a property of a joint distribution function,
   wherein said at least one optical lens magnifies said beam, so that a beam feature originally separated by no more than one pixel is magnified to be spread out over more than one pixel.

2. The system of claim 1, wherein said detector comprises a photodetector.

3. The system of claim 1, wherein said detector comprises a camera.

4. The system of claim 1, wherein said second optical lens is configured to project the resultant beam onto said detector.

5. The system of claim 4, wherein said second optical lens is configured to image said resultant beam onto said detector.

6. The system of claim 4, wherein said second optical lens is configured to perform an optical Fourier transform onto said detector.

7. The system of claim 4, wherein said at least one SLM creates an aperture to select a small portion of said beam.

8. The system of claim 7, wherein said aperture configuration on said at least one SLM is scanned across said beam.

9. The system of claim 1, wherein said second SLM is configured to modulate said beam of entangled photons.

10. The system of claim 1, wherein said first optical lens maps said shaped waveform onto said second SLM, and wherein said second optical lens maps said resultant beam onto said detector.

11. The system of claim 10, wherein said second optical lens focuses a first set of a plurality of selected pixels of said second SLM onto a single pixel of said detector.

12. The system of claim 10, wherein said second optical lens focuses a first set of a plurality of selected pixels of said second SLM onto a plurality of pixels of said detector.

13. The system of claim 1, wherein said second SLM is configured to compare said Fourier modes.

14. The system of claim 1, wherein said at least one SLM further comprises a third SLM configured to amplify a difference between said Fourier modes.

15. The system of claim 1, wherein said at least one SLM is configured to select one or more of said plurality of pixels according to an output of said detector.

16. The system of claim 1, wherein said at least one optical lens is configured for translation.

17. The system of claim 16, wherein said translation of said at least one lens allows detection of measurements in the at least two different optical planes.

18. The system of claim 17, wherein said measurements comprise an image and a defocused image.

19. The system of claim 1, wherein said property is one of a phase and a degree of spatial entanglement.

20. The system of claim 17, wherein said measurements comprise a near-field image and a far-field Fourier transform.

21. The system of claim 20, wherein a difference between respective measurements in the two different optical planes is used to reconstruct a property of a joint distribution function.

22. The system of claim 1, wherein said light source is one of rotated and translated so that an average separation distance between adjacent photons in said entangled beam corresponds to a distance between pixels in said detector.

23. The system of claim 1, wherein said detector is configured to select pairs of entangled photons in said beam of entangled photons according to a separation distance threshold.

24. The system of claim 23, wherein said separation distance threshold corresponds to at least one pair of entangled photons.

25. The system of claim 23, wherein said separation distance threshold corresponds to every pairwise distance within a larger number of entangled photons.

26. The system of claim 1, wherein said at least one SLM is configured as a function of measurements made in said detector.

27. The system of claim 1, wherein said at least one SLM is configured to encode quantum information to be found via Grover's search algorithm.

28. The system of claim 27, wherein said at least one SLM is configured by varying a phase of the beam.

29. The system of claim 27, wherein said second SLM is configured to perform an inverse amplitude amplification step to isolate a desired element of the quantum information by reversing its phase and amplifying its amplitude about a mean.

30. The system of claim 29, wherein said inverse amplitude amplification step is continued until a threshold in said detector is reached, said threshold indicating that a probability of detecting the desired element is significantly greater than respective probabilities of detecting other elements.

31. The system of claim 1, wherein:
   the quantum information includes a quantum bit.

* * * * *